(12) United States Patent
Nakatani

(10) Patent No.: US 7,477,048 B2
(45) Date of Patent: Jan. 13, 2009

(54) BOOSTING SWITCHING REGULATOR

(75) Inventor: Takeshi Nakatani, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 12/012,719

(22) Filed: Feb. 5, 2008

(65) Prior Publication Data

US 2008/0203986 A1 Aug. 28, 2008

(51) Int. Cl.
*G05F 1/40* (2006.01)
(52) U.S. Cl. .................. 323/285; 323/271; 323/290
(58) Field of Classification Search ............. 323/222, 323/225, 271, 282, 284, 285, 290, 351; 327/536, 327/537
See application file for complete search history.

(56) References Cited

U.S. PATENT DOCUMENTS 5,892,267 A * 4/1999 Takada .................. 327/536
6,307,361 B1 * 10/2001 Yaakov et al. .......... 323/284
2005/0024908 A1 * 2/2005 Gizara .................. 363/147
2008/0074089 A1 * 3/2008 Yu et al. ................ 323/222

FOREIGN PATENT DOCUMENTS

JP 2005160198 6/2005

* cited by examiner

*Primary Examiner*—Jessica Han
(74) *Attorney, Agent, or Firm*—Adams & Wilks

(57) ABSTRACT

When a boosting operation stops, it is ensured that a boosting switching regulator does not output an output voltage. When a high signal is applied to the gate of a PMOS transistor Q1 to turn off the transistor Q1, a higher voltage of an input voltage VDD and an output voltage VOUT is supplied to a buffer 171 as a supply voltage, and the higher voltage is applied to the gate of the transistor Q1 by the buffer 171. As a result, the transistor Q1 can be surely turned off. Hence, when the boosting operation by the boosting switching regulator stops, the transistor Q1 that outputs the output voltage VOUT can be surely turned off. Also because the voltage based on the input voltage VDD is applied to the back gate of the transistor Q1 by the switch 3, the parasitic bipolar transistor caused by the transistor Q1 is not turned on.

1 Claim, 1 Drawing Sheet

BOOSTING SWITCHING REGULATOR

BACKGROUND OF THE INVENTION

1. Field of the Invention

The present invention relates to a chopper type boosting switching regulator.

2. Description of the Related Art

A conventional boosting switching regulator will be described. FIG. 2 is a block diagram showing a conventional boosting switching regulator.

In the boosting switching regulator, a transistor Q11 that is controlled by a buffer 181 turns off, a transistor Q12 that is controlled by a buffer 182 turns on, and a current from an input power supply 35 flows into a ground through a coil L10 and the transistor Q12. In this stage, energy is accumulated in the coil L10. Thereafter, after the transistor Q12 turns off, the transistor Q11 turns on, and the energy that has been accumulated in the coil L10 is accumulated in a capacitor C10 that is connected to an output terminal through the transistor Q11. An output voltage VOUT of the output terminal is transmitted to a control circuit 18 through a resistor (not shown), and the control circuit 18 controls the transistor Q11 and the transistor Q12 so as to hold the output voltage VOUT at a constant voltage higher than an input voltage VDD of the input power supply 35 on the basis of the transmitted voltage (for example, refer to JP 2005-160198 A).

The buffer 181 outputs a voltage that swings between the input voltage VDD and the output voltage VOUT to the transistor Q11, and the buffer 182 outputs a voltage that swings between the input voltage VDD and a ground voltage to the transistor Q12.

Also, a back gate voltage of the transistor Q11 is the output voltage VOUT.

However, in the conventional boosting switching regulator, when the input voltage VDD is applied while boosting operation is stopped, there is a possibility that the output voltage VOUT based on the input voltage VDD is output by the aid of the coil L10 and a parasitic bipolar transistor of the transistor Q11 whose back gate voltage is indefinite.

Also, in the case where the output voltage VOUT is not output while the boosting operation is stopped, because the power is not supplied to the buffer 181, there is a possibility that the transistor Q11 turns on. When the input voltage VDD is applied, there is the possibility that the output voltage VOUT based on the input voltage VDD is output by the aid of the coil L10 and the transistor Q11.

SUMMARY OF THE INVENTION

The present invention has been made in view of the above circumstances, and therefore an object of the present invention is to provide a boosting switching regulator that surely does not output the output voltage while the boosting operation is stopped.

The present invention has been made to solve the above-mentioned problems, and provides a chopper type boosting switching regulator including: a first transistor disposed between another end of a coil having one end connected to an input terminal and an output terminal to output an output voltage from the output terminal; a second transistor disposed between the another end of the coil and a ground; a voltage divider circuit disposed between the output terminal and the ground; a first buffer that drives the first transistor so as to hold the output voltage of the output terminal at a constant voltage on the basis of an output voltage from the voltage divider circuit; a second buffer that drives the second transistor so as to hold the output voltage of the output terminal at the constant voltage on the basis of the output voltage from the voltage divider circuit; a comparator circuit that compares an input voltage of the input terminal with the output voltage of the output terminal; a first switch that supplies a higher voltage of the input voltage of the input terminal and the output voltage of the output terminal to the first buffer as a supply voltage on the basis of a comparison result of the comparator circuit; a second switch that supplies the higher voltage to the second buffer as the supply voltage on the basis of the comparison result of the comparator circuit; and a third switch that connects a back gate of the first transistor to one of the another end of the coil and the output terminal.

In the present invention, in the case where a high signal is applied to the gate of the transistor to turn off the transistor, a higher voltage of the input voltage and the output voltage is supplied to the first buffer and the second buffer as the supply voltage, and the higher voltage is applied to the gate of the transistor by those buffers. As a result, the transistor can be surely turned off. Hence, when the boosting operation stops due to the boosting switching regulator, because the transistor that outputs the output voltage can be surely turned off, the boosting switching regulator surely does not output the output voltage.

DETAILED DESCRIPTION OF THE PREFERRED EMBODIMENTS

Hereinafter, an embodiment of the present invention will be described with reference to the accompanying drawings.

Figure 1:
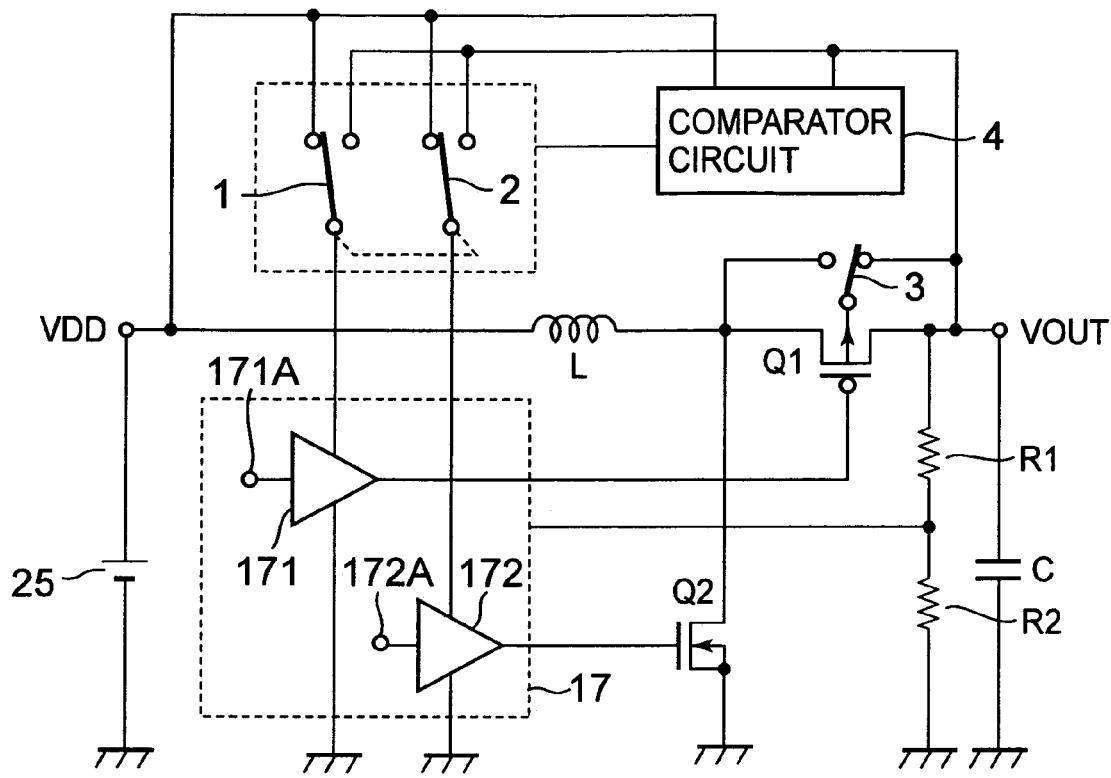
FIG. 1 is a block diagram showing a boosting switching regulator.
Figure 2:
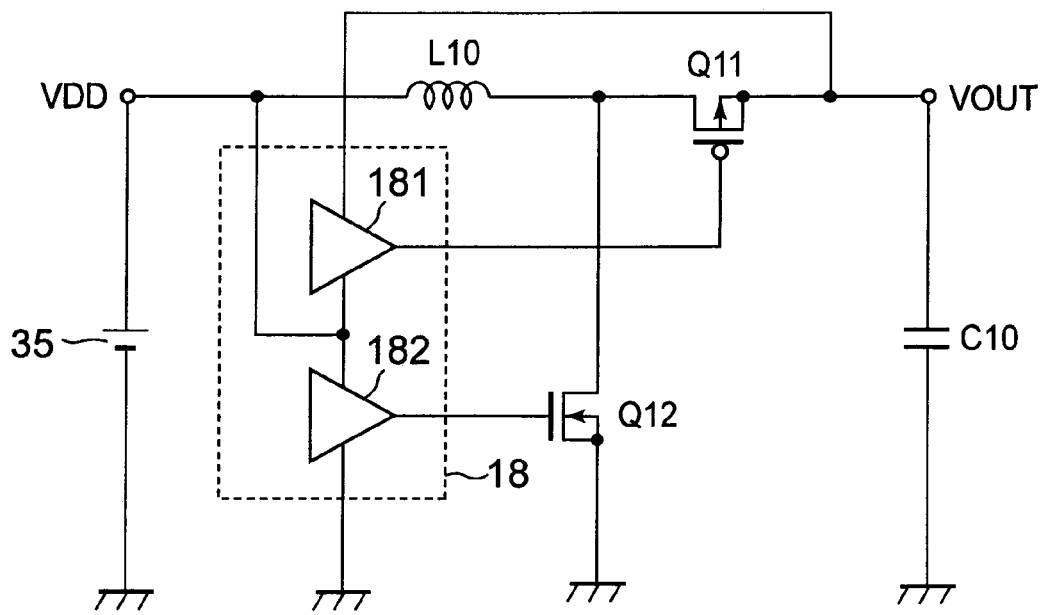
FIG. 2 is a block diagram showing a conventional boosting switching regulator.

First, the configuration of a chopper type boosting switching regulator will be described. FIG. 1 is a block diagram showing a boosting switching regulator.

In the boosting switching regulator, an input voltage VDD is applied to an input terminal, and an output voltage VOUT is output from an output terminal.

In the boosting switching regulator, an input power supply 25 is connected to the input terminal, and an output capacitor C is connected to the output terminal. Also, in the boosting switching regulator, a coil L is disposed between the input terminal and the output terminal.

The boosting switching regulator includes a resistor R1, a resistor R2, a PMOS transistor Q1, an NMOS transistor Q2, a switch 1, a switch 2, a switch 3, a comparator circuit 4, and a control circuit 17. The control circuit 17 includes a buffer 171 having an input terminal 171A, a buffer 172 having an input terminal 172A, and a buffer control circuit (not shown).

Subsequently, the operation of the boosting switching regulator will be described.

A transistor Q1 that is controlled by a buffer 171 turns off, a transistor Q2 that is controlled by a buffer 172 turns on, and a current from an input power supply 25 flows into a ground through a coil L and a transistor Q2. In this stage, energy is accumulated in the coil L. Thereafter, after the transistor Q2 turns off, the transistor Q1 turns on, and the energy that has been accumulated in the coil L is accumulated in the capacitor C that is connected to the output terminal through the transistor Q1. An output voltage VOUT of the output terminal is transmitted to a control circuit 17 through a resistor R1 and a resistor R2 (voltage divider circuit), and the control circuit 17 drives the transistor Q1 and the transistor Q2 so as to hold the output voltage VOUT at a constant voltage higher than an input voltage VDD of the input power supply 25 on the basis of the output voltage from the voltage divider circuit.

Both of the input voltage VDD and the output voltage VOUT are supplied to the switch 1, the switch 2, and the comparator circuit 4. The comparator circuit 4 compares the input voltage VDD with the output voltage VOUT, detects a higher voltage of the input voltage VDD and the output voltage VOUT, and designates the higher voltage to the switch 1 and the switch 2. The switch 1 and the switch 2 supply the higher voltage to the buffer 171 and the buffer 172 as a supply voltage, respectively. The higher voltage drives the buffer 171 and the buffer 172, respectively. That is, in the case where the input voltage VDD>the output voltage VOUT, the supply voltage of the buffer 171 or the buffer 172 is the input voltage VDD that has been subjected to voltage drop due to the on-resistance of the switch 1 or the switch 2. In the case where the input voltage VDD<the output voltage VOUT, the supply voltage of the buffer 171 and the buffer 172 is the output voltage VOUT that has been subjected to voltage drop due to the on-resistance of the switch 1 or the switch 2. In this situation, when the voltage at the input terminal 171A of the buffer 171 becomes high or low, the output voltage of the buffer 171 (the gate voltage of the transistor Q1) becomes high or low. Also, when the voltage of the input terminal 172A of the buffer 172 becomes high or low, the output voltage of the buffer 172 (the gate voltage of the transistor Q2) becomes high or low.

The buffer control circuit controls the buffer 171 and the buffer 172 at an output stage inside the control circuit 17, and the buffer 171 and the buffer 172 drive the transistor Q1 and the transistor Q2, respectively. The transistor Q1 and the transistor Q2 alternately turn on, and the transistor Q1 outputs a DC output voltage VOUT from the output terminal on the basis of the on/off timing of the transistor Q1 and the transistor Q2 and the input voltage VDD. Because the output voltage VOUT has been boosted, the voltage value is higher than the input voltage VDD.

Subsequently, the operation of the switch 3 will be described.

When the boosting operation stops due to the boosting switching regulator, the switch 3 connects the back gate of the transistor Q1 to the coil L on the input terminal side. The buffer 171 outputs the high signal to the transistor Q1 to turn off the transistor Q1, the buffer 172 outputs the low signal to the transistor Q2 to turn off the transistor Q2, and the output voltage VOUT is not output. In this situation, the comparator circuit 4 compares the input voltage VDD with the output voltage VOUT, detects the input voltage VDD that is a higher voltage, and designates the input voltage VDD to the switch 1 and the switch 2. The switch 1 and the switch 2 supply the input voltage VDD to the buffer 171 and the buffer 172, respectively. The input voltage VDD that is a higher voltage drives the buffer 171 and the buffer 172, respectively. Hence, the high signal from the buffer 171 becomes the input voltage VDD that is the higher voltage, and the low signal from the buffer 172 become the ground voltage.

With the above configuration, in the case where the high signal is applied to the gate of the PMOS transistor Q1 to turn off the transistor Q1, the higher voltage of the input voltage VDD and the output voltage VOUT is supplied to the buffer 171 as the supply voltage, and the higher voltage is applied to the gate of the transistor Q1 by the buffer 171. As a result, the transistor Q1 can be surely turned off, and the transistor Q1 and the transistor Q2 are not turned on at the same time.

Hence, when the boosting operation stops due to the boosting switching regulator, because the transistor Q1 that outputs the output voltage VOUT can be surely turned off, the boosting switching regulator surely does not output the output voltage VOUT.

Also, when the boosting operation stops due to the boosting switching regulator, the voltage based on the input voltage VDD is applied to the back gate of the transistor Q1 by the aid of the switch 3 with the result that the parasitic bipolar transistor caused by the transistor Q1 is not turned on.

Further, because the switch 1 and the switch 2 are disposed, and the buffer 171 and the buffer 172 are connected to those switches 1 and 2, respectively, the supply voltage of the buffer 171 and the buffer 172 becomes the higher voltage of the input voltage VDD and the output voltage VOUT after the voltage has dropped due to the on-resistance of the switch 1 or the switch 2. Hence, the supply voltage of the buffer 171 depends only on the on-resistance of the switch 1 irrelevant to the on-resistance of the switch 2, and the supply voltage of the buffer 172 depends only on the on-resistance of the switch 2 irrelevant to the on-resistance of the switch 1. Hence, for example, even if the buffer 172 is driven, a large current flows in the switch 2, and a voltage developed in the on-resistance of the switch 2 becomes higher, because the supply voltage of the buffer 171 is irrelevant to the voltage that is developed in the on-resistance of the switch 2, the supply voltage of the buffer 171 does not fluctuate, and the buffer 171 does not malfunction.

When the boosting operation is conducted by the boosting switching regulator, the switch 3 connects the back gate of the transistor Q1 to the output terminal. In the case where the buffer 171 outputs the high signal to the transistor Q1 to turn off the transistor Q1, the buffer 172 also outputs the high signal to the transistor Q2 to turn on the transistor Q2. In the case where the buffer 171 outputs the low signal to the transistor Q1 to turn on the transistor Q1, the buffer 172 also outputs the low signal to the transistor Q2 to turn off the transistor Q2. Then, the transistor Q1 and the transistor Q2 alternately turn on to output the output voltage VOUT. In this situation, the comparator circuit 4 compares the input voltage VDD with the output voltage VOUT, detects the output voltage VOUT that is a higher voltage, and designates the output voltage VOUT to the switch 1 and the switch 2. The switch 1 and the switch 2 supply the output voltage VOUT to the buffer 171 and the buffer 172, respectively. The output voltage VOUT that is the higher voltage drives the buffer 171 and the buffer 172, respectively. Hence, the high signal from the buffer 171 or the buffer 172 becomes the output voltage VOUT that is the higher voltage, and the low signal from the buffer 171 or the buffer 172 becomes the ground voltage.

With the above operation, in the case where the high signal is applied to the gates of the PMOS transistor Q1 and the NMOS transistor Q2 to turn off the transistor Q1 and turn on the transistor Q2, the higher voltage of the input voltage VDD and the output voltage VOUT is applied to the gates of the transistor Q1 and the transistor Q2. As a result, the transistor Q1 and the transistor Q2 can be surely turned on/off, and the transistor Q1 and the transistor Q2 are not turned on at the same time. Hence, when the boosting operation is conducted by the boosting switching regulator, the transistor Q1 and the transistor Q2 normally alternately turn on, and the boosting switching regulator can normally conduct the boosting operation.

Also, when the boosting operation is conducted by the boosting switching regulator, the higher voltage of the input voltage VDD and the output voltage VOUT is applied to the gate of the transistor Q2, thereby reducing the on-resistance of the transistor Q2. Hence, the power conversion efficiency due to the coil L becomes higher in a route of the input terminal, the coil L, the transistor Q2, and the ground.

The buffer 171 and the buffer 172 may each be an inverter instead of a buffer. In this situation, a control circuit that controls the buffer 171 and the buffer 172 is so designed as to control the inverter instead of the buffer.

What is claimed is:

1. A chopper type boosting switching regulator, comprising:
   a first transistor disposed between another end of a coil having one end connected to an input terminal and an output terminal to output an output voltage from the output terminal;
   a second transistor disposed between the another end of the coil and a ground;
   a voltage divider circuit disposed between the output terminal and the ground;
   a first buffer that drives the first transistor so as to hold the output voltage of the output terminal at a constant voltage on the basis of an output voltage from the voltage divider circuit;
   a second buffer that drives the second transistor so as to hold the output voltage of the output terminal at the constant voltage on the basis of the output voltage from the voltage divider circuit;
   a comparator circuit that compares an input voltage of the input terminal with the output voltage of the output terminal;
   a first switch that supplies a higher voltage of the input voltage of the input terminal and the output voltage of the output terminal to the first buffer as a supply voltage on the basis of a comparison result of the comparator circuit;
   a second switch that supplies the higher voltage to the second buffer as the supply voltage on the basis of the comparison result of the comparator circuit; and
   a third switch that connects a back gate of the first transistor to one of the another end of the coil and the output terminal.

* * * * *

UNITED STATES PATENT AND TRADEMARK OFFICE
CERTIFICATE OF CORRECTION

PATENT NO. : 7,477,048 B2
APPLICATION NO. : 12/012719
DATED : January 13, 2009
INVENTOR(S) : Nakatani It is certified that error appears in the above-identified patent and that said Letters Patent is hereby corrected as shown below:

Title page add:

--Foreign Application Priority Data

February 7, 2007 [JP] Japan....2007-028300--

Signed and Sealed this
Third Day of April, 2012

David J. Kappos
*Director of the United States Patent and Trademark Office*